Oct. 22, 1957 R. P. JOSLIN 2,810,650
REFRIGERATION OF DOUGHS AND BATTERS INCLUDING AS A LEAVENING
COMPONENT DICALCIUM PHOPSHATE DIHYDRATE
Filed March 4, 1955
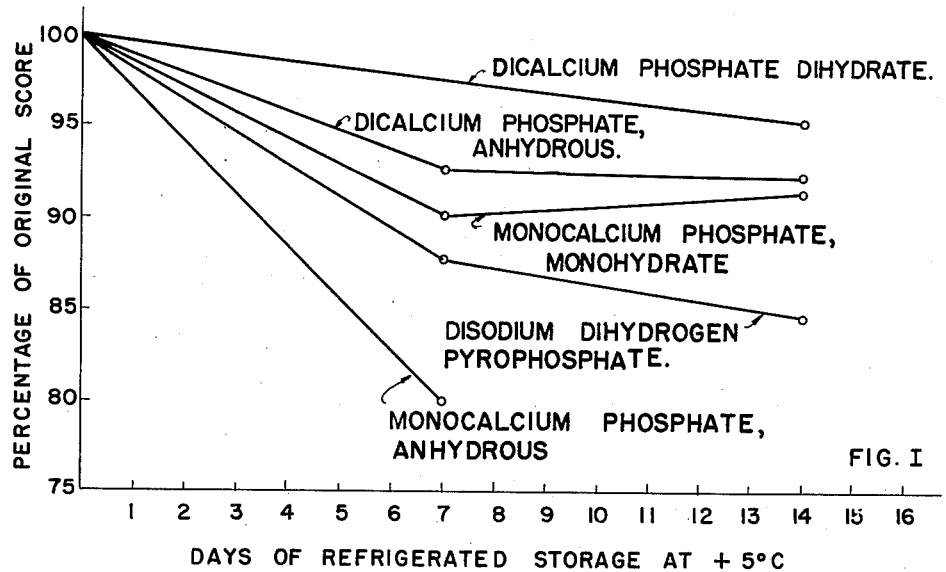
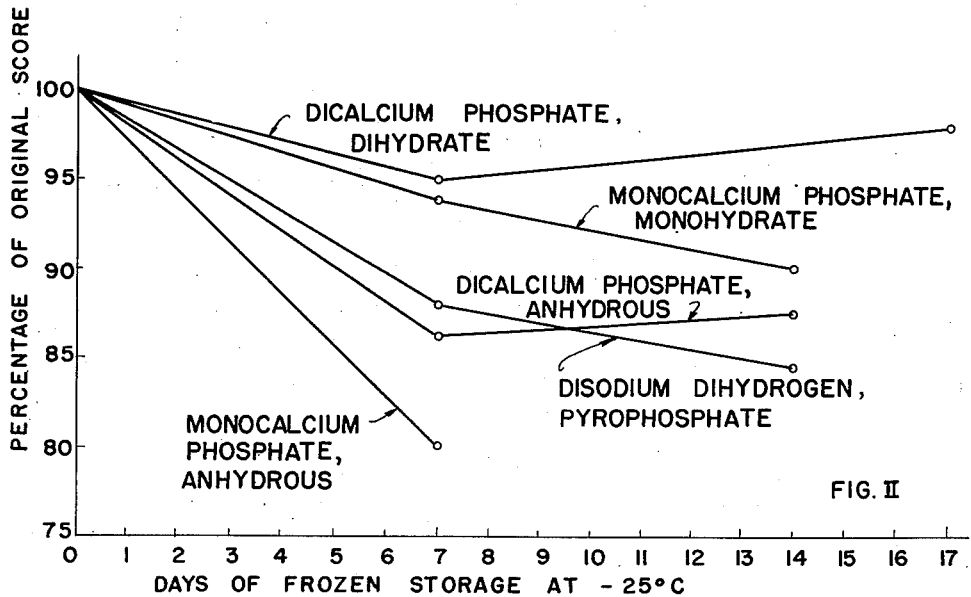
INVENTOR.
ROBERT P. JOSLIN
BY
HIS ATT'Y.

United States Patent Office 2,810,650
Patented Oct. 22, 1957

2,810,650

REFRIGERATION OF DOUGHS AND BATTERS INCLUDING AS A LEAVENING COMPONENT DICALCIUM PHOSPHATE DIHYDRATE

Robert P. Joslin, Omaha, Nebr., assignor to Monsanto Chemical Company, St. Louis, Mo., a corporation of Delaware Application March 4, 1955, Serial No. 492,125

11 Claims. (Cl. 99—90)

The present invention relates to the refrigeration of doughs and batters which are intended to be baked into cakes, biscuits, cookies and the like. The invention is also directed to packaged dough suitable for storage without excessive gas evolution, and prepared ready for subsequent baking in the home.

It has been recognized in the art that the preparation of dough and batter for baked products to be stored under refrigeration and frozen storage presents a difficult problem with regard to leavening action. It has been found that conventional leavening agents slowly evolve their expansion gas during storage, even at very low temperatures. Inasmuch as it is necessary that such prepared mixes maintain their potential dough reactivity during cold storage in order to rise properly upon subsequent heating, it is essential that a leavening agent having low temperature stability be provided.

It has now been found that farinaceous doughs and batters for cakes, gingerbread, cookies, biscuits, waffles, pancakes, etc., suitable for low temperature storage may be prepared by the use of a specific leavening agent, namely, dicalcium phosphate dihydrate. It has been found that this compound is of utility in a wide variety of doughs and batters, and may be employed as the sole leavening agent or in combination with other leavening components. The dicalcium phosphate dihydrate, although normally characterized as alkaline, has been found to be of utility in the same manner as acidic compounds to release gas by reaction with a bicarbonate, which may advantageously be employed with the proportion of phosphate relative to the bicarbonate, varying from 5:1 to 1:1, a preferred ratio being about 3:1. Sodium or potassium bicarbonate and similar gas-releasing compounds may be employed.

The leavening activity and stability of the dihydrate of dicalcium phosphate is particularly surprising in view of the inactivity of the anhydrous form of dicalcium phosphate which is substantially without leavening activity. This is an unexpected result since it is known that other leavening agents such as monocalcium phosphate are active both as the hydrate and in the anhydrous form. The essential component of the present invention, i. e., dicalcium phosphate dihydrate, when employed for refrigerated and frozen doughs and batters may also be supplemented in minor proportions, preferably less than ten percent of the leavening components, of monocalcium phosphate or other commercial leavening agents, such as cream of tartar, tartrates, phosphates, sulfates, or other commercial leavening agents.

An object of the present invention is to provide a low temperature stable leavening agent which may be maintained in contact with a bicarbonate in the presence of liquids such as water, milk, and whole eggs, for long periods of time at refrigerated and frozen storage conditions without substantial release of leavening gases. However, it is likewise essential that the leavening agent which is employed shall be available and active to evolve leavening gases such as carbon dioxide when the previously refrigerated mixture is placed in an oven. It is also important that the dough gasification power can be delayed to maintain the gas evolution potential sufficiently for doughs or batters to be prepared under commercial operating conditions.

The leavening compositions of the present invention are particularly suitable for commercial use. Since the low temperature release of gas in the present doughs using dicalcium phosphate dihydrate is far below that of conventional leavening agents, it is possible to process the dough or batter in large batches which require longer mixing time. Machine action does not cause any appreciable increase in the gas release from doughs employing the hydrate for leavening action.

Doughs and batters contemplated in the present invention may be also partially baked, i. e., without reaching maximum temperature in the interior of the shaped dough mass. Products of this type may be refrigerated or frozen and then stored until desired for use. Upon removal from storage, the partially baked articles may be placed directly into an oven and baked in a conventional manner. Leavening action of the dicalcium phosphate dihydrate then occurs to give the desired product.

It has been found that leavening compositions employing dicalcium phosphate dihydrate and sodium bicarbonate make it possible to provide mixtures having a carbon dioxide release value (Chittick test) which is less than 20 percent of the total gas at 25° C., but which is also in excess of 30 percent at 100° C. It has been found that mixtures which meet the above criteria are likewise satisfactory for storage at refrigeration conditions (0° C. to +15° C.) and frozen food storage (−50° C. to 0° C.).

The effectiveness of dicalcium phosphate dihydrate in retaining gas release potential at low temperatures is illustrated in the following tests. The respective leavening agents were used in a modified Chittick test (Cereal Laboratory Methods, page 199, American Association of Cereal Chemists, 1947), in which the sample with 33 percent by weight of sodium bicarbonate was mixed with water at 25° C. until no further gas was released. The resultant solution was then heated to 100° C. to determine the high temperature gas evolution. The amount of residual gas was then measured by the addition of hydrochloric acid until no further gas was evolved.

*Table I.—Gas release*

| | Low Temp. Gas Release | | High Temp. Release | Residual (Unavailable) |
|---|---|---|---|---|
| | Absolute Value | Increment Over NaHCO₃ Blank | | |
| Dicalcium phosphate dihydrate | 7.5 | 0.5 | 82.1 | 10.4 |
| Dicalcium phosphate, anhydrous | 9 | 2 | 60 | 30 |
| Monocalcium phosphate monohydrate | 80 | 76 | 17 | 3 |
| Monocalcium phosphate, anhydrous | 76.9 | 69.9 | 16.4 | 6.7 |
| Disodium dihydrogen pyrophosphate | 71 | 64 | 25 | 4 |
| Sodium aluminum sulfate | 28 | 21 | 72 | 0 |
| Cream of tartar | 95 | 88 | 0.8 | 3.7 |
| Sodium bicarbonate (blank) | 7 | 0 | 15 | 75 |

The above data shows that the dicalcium phosphate dihydrate is unusually efficacious for use in the preparation of refrigerated and frozen doughs because of the low initial gas evolution at low temperatures, concomitant with a high gas release value at higher temperatures such as oven temperatures.

The following examples illustrate, but do not limit, weight formulae and procedures for making a white cake, a yellow cake, and a chocolate cake, respectively, in accordance with the present invention. The cake formulae given below were also used as the basis for comparison tests with the substitution of similar amounts of other leavening components in order to test low temperature dough stability. The proportions are given in parts by weight; in the table DCP refers to dicalcium phosphate as either the dihydrate or in anhydrous form. MCP refers to monocalcium phosphate, tested both as an anhydrous product commercially available in stabilized form, and also as the monohydrate. In general, the various leavening agents may be used in the several stabilized forms which may be produced by thermal treatments or the use of minor amounts of added salts.

| Formula | Cake | | |
|---|---|---|---|
| | White | Yellow | Devil's Food |
| Flour | 200 | 194.4 | 140.4 |
| Sucrose | 192 | 194.5 | 203.0 |
| Shortening | 65 | 75 | 80 |
| Milk, powder | 20 | 20 | 20 |
| Dutched cocoa | 0 | 0 | 40 |
| Dried egg white | 6 | 0 | 0 |
| Dicalcium phosphate dihydrate | 9.6 | 9.1 | 8.2 |
| Sodium bicarbonate | 3.2 | 3 | 4.5 |
| Salt | 4 | 4 | 4 |
| Vanillin | 0.05 | 0.05 | 0.05 |
| Fresh eggs | 0 | 100 | 100 |
| Water | 220 | 180 | 180 |
| Original Score | 89 | 85 | 94 |

The above cakes were prepared by mixing the shortening with the sugar followed by the other dry ingredients, after which the liquid components were added by mixing to obtain the batter.

The refrigeration tests were conducted by hermetically sealing the freshly prepared batters in cans. These cans were then stored in a refrigerator maintained at $+5°$ C. The individual cans of batter were removed from the refrigerator at periods of from 7 to 14 days or after longer periods, if desired. Gas pressures within the cans were measured by the use of a punch test gage. The test cakes were baked in individual aluminum pans containing 400 grams of batter.

*Table II.—Pressure data*

| White cake | Leavening acid | Original cake and days' storage | Pressure, p. s. i. |
|---|---|---|---|
| 1 | DCP dihydrate | 0 | 0 |
| | | 14 | 0 |
| | | 45 | 0.5 |
| 2 | Disodium dihydrogen pyrophosphate | 0 | 0 |
| | | 7 | 5.3 |
| | | 14 | 6 |

In conducting the freezing tests the above batters were mixed, and immediately poured into cake pans which were sealed in polyethylene bags and were then frozen at a temperature of $-15°$ C. to $-25°$ C. for periods of about one and two weeks. At the conclusion of this time, the frozen batters were removed from the freezer and were placed without thawing in an oven at 350° F. It was found that the standard baking period of thirty minutes was sufficient to give a good crumb color and texture. Upon examination of the cakes, they were found to have a uniform structure evidencing moderate and uniform gas release during baking. The frozen cakes as well as control cakes baked immediately after mixing were scored by a modification of the method described in Cereal Laboratory Methods, page 145, American Association of Cereal Chemists, 1947. The rating factors considered the symmetry and crust appearance with regard to external characteristics while the internal characteristics were measured with respect to tenderness, texture, crumb color, flavor and volume. In the tables as set forth below, the individual scores in each series with respect to a particular variety were recalculated using the control score of the original freshly baked cake at an arbitrary value of 100, and with the other scores of the series being calculated in terms of percentage of the control score.

*Table III.—Refrigeration data*

| White cake | Leavening acid | Test cake and days' storage | Score (percent of control) |
|---|---|---|---|
| 1 | DCP.2H₂O | 0, control | 100 |
| | | 14 | 94 |
| | | 45 | 89 |
| 2 | DCP (anhyd.) | 0, control | 100 |
| | | 7 | 86 |
| | | 14 | 88 |
| 3 | Disodium dihydrogen pyrophosphate | 0, control | 100 |
| | | 7 | 88 |
| | | 14 | 84 |
| | | 45 | 75 |
| 4 | MCP (anhyd.) | 0, control | 100 |
| | | 7 | 80 |
| 5 | MCP, monohydrate | 0, control | 100 |
| | | 7 | 90 |
| | | 14 | 91 |
| 6 | Soda alone (no acid component) | 0, control | 100 |
| | | 7 | 99 |
| | | 14 | 93 |

*Table IV.—Data of frozen batters*

| White cake | Leavening | Test and days' storage | Score (percent of control) |
|---|---|---|---|
| 1 | DCP.2H₂O | 0, control | 100 |
| | | 7 | 95 |
| | | 17 | 98 |
| 2 | DCP (anhyd.) | 0, control | 100 |
| | | 7 | 87 |
| | | 14 | 88 |
| 3 | Disodium dihydrogen pyrophosphate | 0, control | 100 |
| | | 7 | 88 |
| | | 14 | 84 |
| | | 75 | 75 |
| 4 | MCP (anhyd.) | 0, control | 100 |
| | | 7 | 80 |
| 5 | MCP, monohydrate | 0, control | 100 |
| | | 7 | 94 |
| | | 14 | 90 |
| 6 | Soda alone (no acid component) | 0, control | 100 |
| | | 7 | 82 |
| | | 14 | 81 |

The above data referring to refrigerated and frozen cake batters is illustrative of the retention of leavening action. These results are shown in graphical form in the drawings of the present patent application which summarize the cake scores determined on white cakes by the use of: (1) dicalcium phosphate dihydrate, (2) disodium dihydrogen pyrophosphate, (3) monocalcium phosphate, anhydrous, (4) monocalcium phosphate, monohydrate, and (5) dicalcium phosphate, anhydrous. Figure I refers to refrigerated batter stored at $+5°$ C., while Figure II shows data of frozen batter stored at $-25°$ C.

The above data show the superiority of the dicalcium phosphate dihydrate in retaining leavening action of cake batters subjected to freezing and prolonged low temperature storage.

Similar tests conducted on other baking products indicated that the dicalcium phosphate dihydrate is likewise of value in such mixtures intended for refrigerated and frozen storage. It is also an advantage of the present doughs, batters, and also dry mixes based upon dicalcium phosphate dihydrate that flour and mix degradation is greatly reduced. For example, the gluten degradation, and consequent loss of dough volume is far larger when sodium aluminum sulfate is used as compared to dicalcium phosphate dihydrate. The dicalcium phosphate dihydrate is also advantageously employed because of its property of reducing rancidity relative to sodium aluminum sulfate, for example, in the presence of oily constituents such as corn meal used in mixtures or as the sole farinaceous ingredient.

The present invention also contemplates the use of dicalcium phosphate dihydrate in dry mixes. Premature reaction between the sodium bicarbonate and the acid leavening agent is considerably reduced in the application of dicalcium phosphate dihydrate relative to other leavening agents.

Dicalcium phosphate dihydrate may be used in combination with other leavening components, but should be the major constituent, preferably with no more than 10 percent of other leavening agents reactive with sodium bicarbonate.

In the measurement of gas evolution values, the data refer to the action on soda of the leavening component alone. In this way, a correction may be applied for the acidity of the flour, cornmeal or other acidic ingredients, thus eliminating this disturbing variable.

When reference is made herein to the low temperature gas evolution value, such value is for convenience referred to the above described Chittick test conducted at about 25° C. using a reaction time of 15 minutes to 1 hour.

What is claimed is:

1. A dough characterized by low temperature stability and including as a leavening component dicalcium phosphate dihydrate in combination with a bicarbonate selected from the group consisting of sodium bicarbonate and potassium bicarbonate.

2. A dough mixture characterized by a gas evolution value of less than 20 percent at 25° C. comprising dicalcium phosphate dihydrate in combination with from 5:1 to 3:1 proportions by weight of sodium bicarbonate, relative to said bicarbonate.

3. A dough mixture characterized by a gas evolution value of less than 20 percent at 25° C. and greater than 30 percent at 100° C. comprising dicalcium phosphate dihydrate in combination with from 5:1 to 3:1 proportions by weight of sodium bicarbonate, relative to said bicarbonate.

4. Farinaceous doughs including flour and a combination of dicalcium phosphate dihydrate together with sodium bicarbonate in the proportions of from 5:1 to 1:1 relative to the said bicarbonate.

5. The process of leavening a dough subjected to low temperature storage which comprises mixing dicalcium phosphate dihydrate and sodium bicarbonate in proportions of from 5:1 to 1:1 relative to the said sodium bicarbonate, in a farinaceous dough, thereafter storing the said dough mixture while evolving less than 20 percent of the total potential gas at a storage temperature in the range of from −50° C. to +15° C., and thereafter heating the said mixture to bake the said dough with the release of at least 30 percent of the total potential gas.

6. The process of leavening a dough subjected to low temperature storage which comprises mixing dicalcium phosphate dihydrate and sodium bicarbonate in proportions of from 5:1 to 1:1 relative to the said sodium bicarbonate, in a farinaceous dough, thereafter storing the said dough mixture while evolving less than 20 percent of the total potential gas at a storage temperature in the range of from −50° C. to 0° C., and thereafter heating the said mixture to bake the said dough with the release of at least 30 percent of the total potential gas.

7. The process of leavening a dough subjected to low temperature storage which comprises mixing dicalcium phosphate dihydrate and sodium bicarbonate in proportions of from 5:1 to 1:1 relative to the said sodium bicarbonate, in a farinaceous dough, thereafter storing the said dough mixture while evolving less than 20 percent of the total potential gas at a storage temperature in the range of from 0° C. to +15° C., and thereafter heating the said mixture to bake the said dough with the release of at least 30 percent of the total potential gas.

8. The process of storing a farinaceous dough leavened with sodium bicarbonate in combination with dicalcium phosphate dihydrate, which latter compound is present in proportion of from 0.3 percent to 5 percent by weight of the said dough, and with the sodium bicarbonate present in the proportion of from 5:1 to 1:1, relative to the said bicarbonate, said process including the step of cooling the said dough to a temperature of from −50° C. to +15° C., with the evolution of no more than 20 percent of the carbon dioxide corresponding to the said sodium bicarbonate.

9. The process of storing a farinaceous dough leavened with sodium bicarbonate in combination with dicalcium phosphate dihydrate which latter compound is present in proportion of from 0.3 percent to 5 percent by weight of the said dough, and with the sodium bicarbonate present in the proportion of from 5:1 to 1:1, relative to the said bicarbonate, said process including the step of cooling the said dough to a temperature of from −50° C. to 0° C., with the evolution of no more than 20 percent of the carbon dioxide corresponding to the said sodium bicarbonate.

10. The process of storing a farinaceous dough leavened with sodium bicarbonate in combination with dicalcium phosphate dihydrate which latter compound is present in proportion of from 0.3 percent to 5 percent by weight of the said dough, and with the sodium bicarbonate present in the proportion of from 5:1 to 1:1, relative to the said bicarbonate, said process including the step of cooling the said dough to a temperature of from 0° C. to +15° C., with the evolution of no more than 20 percent of the carbon dioxide corresponding to the said sodium bicarbonate.

11. In the process of baking, mixing dough for baked goods from flour and sodium bicarbonate in combination with from 0.3 percent to 5 percent of dicalcium phosphate dihydrate, and with the sodium bicarbonate present in the proportion of from 5:1 to 1:1, relative to the said bicarbonate, storing said dough at a temperature of from −50° C. to +15° C. with an evolution of carbon dioxide of less than 20 percent by volume of the theoretical volume corresponding to said bicarbonate, and thereafter heating the said dough at a temperature of 200–500° F. to bake the said dough with a release of more than 30 percent of carbon dioxide.

References Cited in the file of this patent

UNITED STATES PATENTS

| | | |
|---|---|---|
| 1,811,772 | Willoughby | June 23, 1931 |
| 1,887,162 | Lorber | Nov. 8, 1932 |
| 2,029,967 | Hooft | Feb. 4, 1936 |
| 2,039,374 | Young | May 5, 1936 |
| 2,365,438 | Schilb | Dec. 19, 1944 |
| 2,478,618 | Armstrong et al. | Aug. 9, 1949 |

FOREIGN PATENTS

| | | |
|---|---|---|
| 8,658 | Great Britain | June 6, 1884 |
| 252,695 | Great Britain | Jan. 27, 1927 |